United States Patent
Liu et al.

(10) Patent No.: US 12,462,358 B2
(45) Date of Patent: Nov. 4, 2025

(54) METHOD AND DEVICE FOR CHANGING A DYNAMIC RANGE OF LUMINANCE OF AN IMAGE

(71) Applicant: MONTAGE LZ TECHNOLOGIES (CHENGDU) CO., LTD., Sichuan (CN)

(72) Inventors: Chengqiang Liu, Sichuan (CN); Zhimin Qiu, Sichuan (CN); Chia Chen Chang, Sichuan (CN)

(73) Assignee: MONTAGE LZ TECHNOLOGIES (CHENGDU) CO., LTD., Chengdu (CN)

( * ) Notice: Subject to any disclaimer, the term of this patent is extended or adjusted under 35 U.S.C. 154(b) by 358 days.

(21) Appl. No.: 18/180,088

(22) Filed: Mar. 7, 2023

(65) Prior Publication Data
US 2023/0289931 A1    Sep. 14, 2023

(30) Foreign Application Priority Data
Mar. 8, 2022    (CN) .......................... 202210227302.7

(51) Int. Cl.
*G06T 5/00*    (2024.01)
*G06T 5/40*    (2006.01)
(Continued)

(52) U.S. Cl.
CPC ................ *G06T 5/92* (2024.01); *G06T 5/40* (2013.01); *G06T 5/50* (2013.01); *G06T 2207/10016* (2013.01); *G06T 2207/20208* (2013.01)

(58) Field of Classification Search
CPC ... G06T 5/92; G06T 5/40; G06T 2207/10016; G06T 2207/20208; G06T 5/90; H04N 19/142; H04N 19/98; H04N 1/4072
See application file for complete search history.

(56) References Cited

U.S. PATENT DOCUMENTS

| 5,568,571 A * | 10/1996 | Willis .................. G06V 30/162 |
| | | 382/176 |
| 2008/0310714 A1* | 12/2008 | Stern ......................... G06T 5/40 |
| | | 382/169 |

(Continued)

OTHER PUBLICATIONS

Chen, Qian, Guan-Ming Su, and Peng Yin. "Near constant-time optimal piecewise LDR to HDR inverse tone mapping." Digital Photography XI. vol. 9404. SPIE, 2015.*

*Primary Examiner* — Li Liu
(74) *Attorney, Agent, or Firm* — James J. Zhu; Junhe Law Office P.C.

(57) ABSTRACT

This application relates to a method and a device for changing a dynamic range of luminance of an image. The method comprises: extracting luminance statistical information of at least a portion of pixels of a frame to be processed, wherein the frame to be processed has an original dynamic range of luminance; clustering the at least a portion of pixels into pixel groups divided by multiple luminance flag values based on the luminance statistical information of at least a portion of pixels, wherein each of the pixel groups includes a predetermined number of pixels, and pixels of each two adjacent pixel groups are divided by one of the multiple luminance flag values; and generating a conversion mapping relationship based on the multiple luminance flag values such that the frame to be processed is converted into a target frame with a target dynamic range of luminance based on the conversion mapping relationship, wherein the conversion mapping relationship associates original luminance values in the original dynamic range of luminance with target luminance values in the target dynamic range of luminance.

10 Claims, 8 Drawing Sheets

(51) Int. Cl.
*G06T 5/50* (2006.01)
*G06T 5/92* (2024.01)

(56) References Cited

U.S. PATENT DOCUMENTS

| | | | | |
|---|---|---|---|---|
| 2011/0279710 | A1* | 11/2011 | Lee | H04N 23/76 |
| | | | | 348/E9.053 |
| 2016/0358319 | A1* | 12/2016 | Xu | H04N 1/6027 |
| 2022/0122236 | A1* | 4/2022 | Yu | G06T 5/92 |
| 2023/0230216 | A1* | 7/2023 | Fukuda | G06T 5/40 |
| | | | | 382/274 |

* cited by examiner

METHOD AND DEVICE FOR CHANGING A DYNAMIC RANGE OF LUMINANCE OF AN IMAGE

TECHNICAL FIELD

The present disclosure relates to the field of video image processing technologies, and particularly relates to a method and an image processing device for changing a dynamic range of luminance of an image.

BACKGROUND

With the development of display technologies, more and more display devices support displaying video images of high dynamic ranges (HDR). At present, there are a lot of video images of traditional standard dynamic ranges (SDR). These SDR video images cannot be displayed correctly in HDR display devices without preprocessing. In order to display these video images correctly in HDR display devices, it is desired to convert SDR video images into HDR video images. Similarly, for other non-video images, there is also a need for changing a dynamic range of an image to facilitate subsequent processing and display.

Therefore, it is desired to provide a method for changing a dynamic range of luminance of an image.

SUMMARY

An objective of the present application is to provide a method for changing a dynamic range of luminance of an image and an image processing device for adjusting the dynamic range of the image according to the actual applications.

According to an aspect of the application, a method for changing a dynamic range of luminance of an image is provided, the method comprises extracting luminance statistical information of at least a portion of pixels of a frame to be processed, wherein the frame to be processed has an original dynamic range of luminance; clustering the at least a portion of pixels into pixel groups divided by multiple luminance flag values based on the luminance statistical information of at least a portion of pixels, wherein each of the pixel groups includes a predetermined number of pixels, and pixels of each two adjacent pixel groups are divided by one of the multiple luminance flag values; and generating a conversion mapping relationship based on the multiple luminance flag values such that the frame to be processed is converted into a target frame with a target dynamic range of luminance based on the conversion mapping relationship, wherein the conversion mapping relationship associates original luminance values in the original dynamic range of luminance with target luminance values in the target dynamic range of luminance.

In some embodiments of the application, optionally, the luminance statistical information comprises luminance histogram information of the at least a portion of pixels in the frame to be processed; and clustering the at least a portion of pixels into pixel groups comprises: clustering the at least a portion of pixels into the pixel groups based on the luminance histogram information of the at least a portion of pixels.

In some embodiments of the application, optionally, the at least a portion of pixels are selected from pixels of the frame to be processed at a predetermined pixel distance.

In some embodiments of the application, optionally, the conversion mapping relationship comprises conversion mapping parameters for fitting a conversion mapping curve indicative of the conversion mapping relationship.

In some embodiments of the application, optionally, the conversion mapping parameters comprises a Bessel curve control point, and the conversion mapping curve is a Bessel curve.

In some embodiments of the application, optionally, clustering the at least a portion of pixels into the pixel groups comprises: clustering all the pixels of the frame to be processed into the pixel groups divided by multiple points by counting based on a predetermined rule; and summing pixel numbers corresponding to luminance values in the luminance histogram information till each of the multiple points to determine the luminance flag value corresponding to each of the multiple points; and generating a conversion mapping relationship based on the multiple luminance flag values comprising: determining the Bessel curve control point based on the multiple luminance flag values.

In some embodiments of the application, optionally, the predetermined rule is selected from one of the following: dividing evenly, dividing based on a power function or dividing based on an exponential function.

In some embodiments of the application, optionally, determining the luminance flag value corresponding to each of the multiple points comprises: determining a luminance flag value $anchor_{value}$ corresponding to a point $anchor_{thr}$ based on equations below, when a summed pixel number $sum_{prev}$ till a luminance value i−1 and another summed pixel number $sum_{current}$ till a luminance value i satisfy $sum_{prev} < anchor_{thr} \leq sum_{current}$: $anchor_{value}=(i-1)+ra$, $ra=((anchor_{thr}-sum_{prev})/hist_{tab}[i])$, wherein $hist_{tab}[i]$ represents a pixel number corresponding to the luminance value i in the luminance histogram information.

In some embodiments of the application, optionally, determining the Bessel curve control point based on the multiple luminance flag values comprises: determining a value $anchor_{ctl}$ of the Bessel curve control point corresponding to the luminance flag value $anchor_{value}$ based on an equation below: $anchor_{ctl}=(2^H-1)*(anchor_{value}+2^{S-1})/(2^S-1)$, wherein S represents a digital representation bit depth of the original dynamic range of luminance, and H represents a digital representation bit depth of the target dynamic range of luminance.

In some embodiments of the application, optionally, determining the Bessel curve control point further comprises: assigning the values of a portion of the Bessel curve control points greater than the first threshold as the first threshold, and assigning the values of a portion of the Bessel curve control points smaller than the second threshold as the second threshold.

In some embodiments of the application, optionally, the conversion mapping curve is a polynomial fitting curve, and the conversion mapping parameters comprise polynomial fitting coefficients.

In some embodiments of the application, optionally, the conversion mapping curve is an exponential fitting curve, and the conversion mapping parameters comprise a fitting coefficient and a fitting index.

In some embodiments of the application, optionally, converting the frame to be processed into the target frame with the target dynamic range of luminance comprises: determining whether there is a scene change in the frame to be processed relative to multiple adjacent frames; converting, if there is a scene change, the frame to be processed into the target frame only based on the conversion mapping relationship of the frame to be processed; converting, if there is no scene change, the frame to be processed into the target frame based on the conversion mapping relationship of the frame to be processed and the conversion mapping relationship of at least one of the multiple adjacent frames.

In some embodiments of the application, optionally, converting the frame to be processed into the target frame with the target dynamic range of luminance comprises: forming a lookup table based on the conversion mapping relationship; and converting the frame to be processed into the target frame with the target dynamic range of luminance at least partially based on the lookup table.

In some embodiments of the application, optionally, the conversion mapping relationship is a lookup table.

In some embodiments of the application, optionally, the luminance histogram information is an original luminance histogram of the frame to be processed.

In some embodiments of the application, optionally, the luminance histogram information is an adjusted luminance histogram of the frame to be processed, wherein the adjusted luminance histogram limits a count of pixels with respect to at least the first portion of the luminance values of an original luminance histogram of the frame to be processed.

In some embodiments of the application, optionally, a portion of an original histogram greater than the third threshold value is limited to at least the second portion of the luminance value of the original histogram in the adjusted luminance histogram.

In some embodiments of the application, optionally, the original dynamic range of luminance is a Standard-Dynamic Range, and the target dynamic range of luminance is a High-Dynamic Range.

According to another aspect of the application, a method for changing a dynamic range of luminance of an image is provided, the method comprises extracting luminance statistical information of a frame to be processed and each of its multiple adjacent frames, wherein the frame to be processed and each of the multiple adjacent frames have an original dynamic range of luminance, and the luminance statistical information comprises luminance histogram information of at least a portion of pixels; determining whether there is a scene change in the frame to be processed relative to each of its multiple adjacent frames; and if there is no scene change: forming an adjusted luminance histogram information of the at least a portion of pixels in the frame to be processed based on the luminance histogram information of the at least a portion of pixels in the frame to be processed and each of its multiple adjacent frames; clustering the at least a portion of pixels into pixel groups based on the adjusted luminance histogram information, wherein each of the pixel groups includes a predetermined number of pixels, and pixels of each two adjacent pixel groups are divided by one of multiple luminance flag values; and generating a conversion mapping relationship based on the multiple luminance flag values such that the frame to be processed is converted into a target frame with a target dynamic range of luminance at least partially based on the conversion mapping relationship, wherein the conversion mapping relationship associates original luminance values in the original dynamic range of luminance with target luminance values in the target dynamic range of luminance.

According to another aspect of the application, an image processing device is provided, the device comprises a statistical unit configured to extract luminance statistical information of at least a portion of pixels in a frame to be processed, wherein the frame to be processed has an original dynamic range of luminance; a clustering unit configured to cluster the at least a portion of pixels into pixel groups divided by multiple luminance flag values based on the luminance statistical information of the at least a portion of pixels, wherein each of the pixel groups includes a predetermined number of pixels, and pixels of each two adjacent pixel groups are divided by one of the multiple luminance flag values; and a mapping unit configured to generate a conversion mapping relationship based on the multiple luminance flag values such that the frame to be processed is converted into a target frame with a target dynamic range of luminance at least partially based on the conversion mapping relationship, wherein the conversion mapping relationship associates original luminance values in the original dynamic range of luminance with target luminance values in the target dynamic range of luminance.

In some embodiments of the application, optionally, the luminance statistical information comprises luminance histogram information of the at least a portion of pixels in the frame to be processed; and the clustering unit configured to cluster the at least a portion of pixels into the pixel groups based on the luminance histogram information of the at least a portion of pixels.

According to another aspect of the application, an image processing device is provided, the device comprises a statistical unit configured to extract luminance statistical information of a frame to be processed and each of its multiple adjacent frames, wherein the frame to be processed and each of the multiple adjacent frames have an original dynamic range of luminance, and the luminance statistical information includes the luminance histogram information of at least a portion of pixels; a determination unit configured to determine whether there is a scene change in the frame to be processed relative to each of its multiple adjacent frames; a filtering unit configured to form an adjusted luminance histogram information of the at least a portion of pixels in the frame to be processed based on the luminance histogram information of the at least a portion of pixels in the frame to be processed and each of its multiple adjacent frames when the determination unit determines that there is no scene change; a clustering unit configured to cluster the at least a portion of pixels in the frame to be processed into multiple pixel groups based on the adjusted luminance histogram information, wherein each of the pixel groups includes a predetermined number of pixels, and pixels of each two adjacent pixel groups are divided by one of the multiple luminance flag values; and a mapping unit configured to generate a conversion mapping relationship based on the multiple luminance flag values such that the frame to be processed is converted into a target frame with a target dynamic range of luminance at least partially based on the conversion mapping relationship, wherein the conversion mapping relationship associates original luminance values in the original dynamic range of luminance with target luminance values in the target dynamic range of luminance.

The foregoing is an overview of the present application, which may simplify, summarize, and omit details. Those skilled in the art will appreciate that this section is merely illustrative and not intended to limit the scope of the present application in any way. This summary section is neither intended to identify key features or essential features of the claimed subject matter nor intended to act as an auxiliary means for determining the scope of the claimed subject matter.

BRIEF DESCRIPTION OF THE DRAWINGS

The foregoing and other features of the present application will be more fully understood from the following description and the appended claims taken in conjunction with the accompanying drawings. It is to be understood that these drawings depict only a few embodiments of the contents of the present application and should not be construed as limiting the scope of the present application. The contents of the present application will be illustrated more clearly and in more detail with the accompanying drawings.

DETAILED DESCRIPTION

Figure 1:
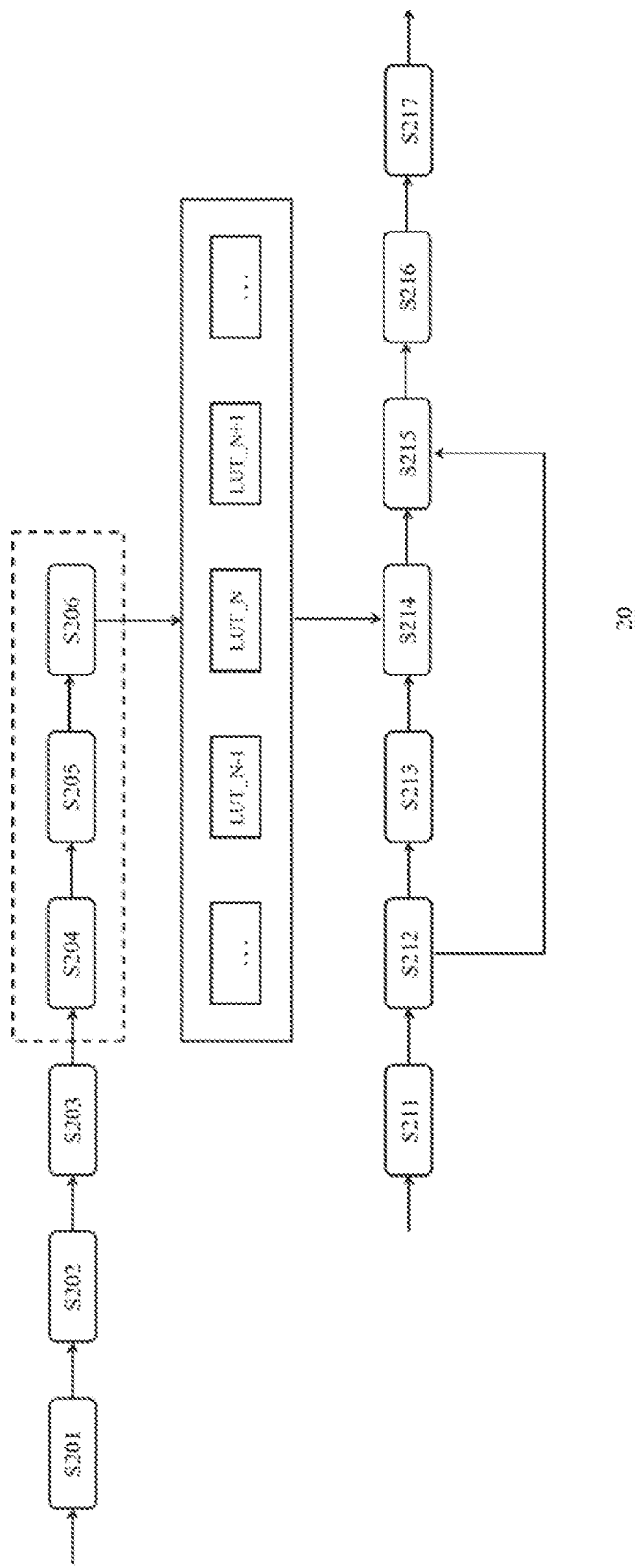
FIG. 1 depicts a method for changing a dynamic range of luminance of an image according to an embodiment of the present application.

In the following detailed description, reference is made to the accompanying drawings which form a part hereof. In the drawings, similar reference numerals generally refer to similar parts unless the context clearly dictates otherwise. The illustrative embodiments described in the detailed description, drawings and claims are not intended to be limiting. Other embodiments may be employed, and other changes may be made without departing from the spirit or scope of the subject matter of the present application. It is to be understood that various configurations, substitutions, combinations, and designs of the various forms of the present application, which are generally described in this application and are illustrated in the drawings, are intended to constitute a part of the present application.

In general, HDR video images can provide a higher dynamic range, more image details and a broader color range than non-HDR (such as SDR) video images. At present, the popular HDR formats mainly include HDR10, HLG (Hybrid Log-Gamma), Dolby Vision, etc. In some applications, the dynamic range of luminance supported by HDR video images is very broad, e.g., up to 10000 nits, while the maximum luminance of SDR video images is only 100~200 nits. Therefore, an important issue in converting SDR images to HDR images is the dynamic range expansion of luminance. This dynamic range expansion process is also called inverse tone mapping operator (iTMO).

Conventionally, when implementing the above dynamic range expansion (iTMO), the adjustment parameters of iTMO function in most methods is independent of image contents and cannot self-adapt to videos with different image contents. For example, F. Banterle, P. Ledda, K. Debattista, and A. Chalmers, "Inverse tone mapping," Proc.—Graph. 2006 4th Int. Conf. Comput. Graph. Interact. Tech. Australas. Southeast Asia, pp. 349-356, 2006 describes the following equation (1) which is used for iTMO expansion:

$$Y_{HDR} = \frac{1}{2} Disp_{max} Y_{white} \left( Y_{SDR} - 1 + \sqrt{(1 - Y_{SDR})^2 - \frac{4}{(Y_{white})^2} Y_{SDR}} \right) \quad (1)$$

where $Y_{HDR}$ is an output HDR luminance value, $Disp_{max}$ represents a maximum display luminance supported by a display device, $Y_{white}$ is an adjustment parameter of a mapping curve, and $Y_{SDR}$ represents a luminance value of a pixel input in a current SDR image. It could be seen that the equation is complex and there is no self-adaptability.

In addition, although a few algorithms can self-adapt to current image contents, their calculations are often too complex to implement with hardware. For example, C. Bist, R. Cozot, G. Madec, and X. Ducloux, "Style aware tone expansion for HDR displays," in Proceedings—Graphics Interface, 2016, pp. 57-63 describes the following equations (2) and (3) which are used for iTMO expansion:

$$Y_{HDR} = Disp_{max}(Y_{SDR})^{\varphi} \quad (2)$$

$$\varphi = 1 + \log_{10}\left(\frac{1}{Y_{median}}\right) \quad (3)$$

where $Y_{HDR}$ is an output HDR luminance value, $Y_{SDR}$ represents a luminance value of an pixel input in a current SDR image, $Disp_{max}$ represents a maximum display luminance supported by a display device, and $Y_{median}$ represents a median luminance in each frame to be processed. It could be seen from the equations (2) and (3) that although the algorithm has some self-adaptability, the calculation is complex, and it is not easy to use hardware to implement it since a power function and an exponential function are used.

In addition, in some methods, the dynamic range of SDR video images is expanded too much, so it is easy to form banded false contours in flat image areas (i.e., with image areas with substantially flat or constant luminance). This will also affect the changing of the dynamic range of images.

FIG. 1 depicts a method for converting an SDR image to an HDR image according to an embodiment of the present application. The method can adopt the method for changing a dynamic range of luminance of an image provided by the present application. In the following, the specifics of changing a dynamic range of luminance of an image will be first introduced. On this basis, realizing the method 20 of converting SDR image to HDR image as shown in FIG. 1 will then be explained.

Figure 2:
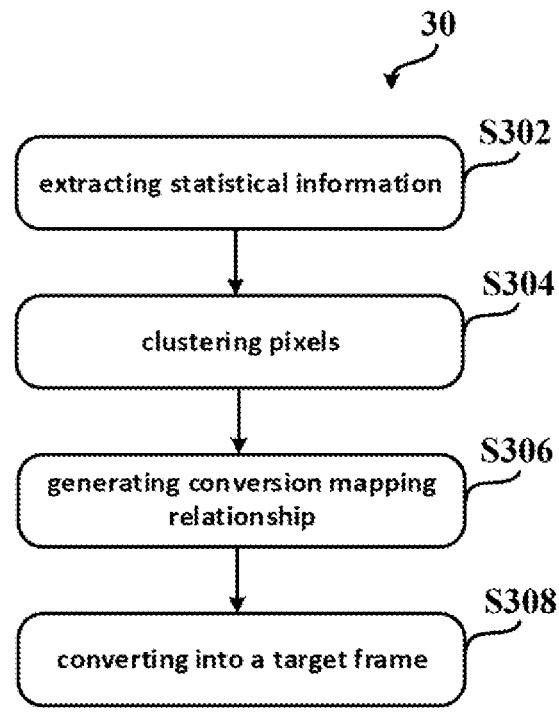
FIG. 2 depicts a method for changing a dynamic range of luminance of an image according to an embodiment of the present application.

FIG. 2 depicts a method for changing a dynamic range of luminance of an image according to an embodiment of the present application. As shown in FIG. 2, the changing method 30 includes steps S302, S304, S306 and an optional step S308.

The changing method 30 extracts luminance statistical information of a frame to be processed in step S302. In this application, the frame to be processed refers to an object to be processed, which has an original dynamic range of luminance. A target frame refers to a desired processing result of the frame to be processed, which has a target dynamic range of luminance. In general, the target dynamic range of luminance can have a larger dynamic range than the original dynamic range of luminance, for example, represented by more digits. In some examples, the original dynamic range of luminance is the Standard-Dynamic Range (SDR), and the target dynamic range of luminance is the High-Dynamic Range (HDR). However, this application is not limited to this conversion. In some applications where the original dynamic range of luminance has a larger dynamic range than the target dynamic range of luminance, various embodiments of this application may also be applicable, and the protection scope of this application also extends to these scenarios.

In some examples, as long as the luminance statistical information extracted in step S302 could be used in the tasks of the subsequent steps, the form, content, etc. of the luminance statistical information may change and not be limited to those described herein.

In some examples, the luminance statistical information extracted in step S302 includes luminance histogram information of at least a portion of pixels in the frame to be processed. As an example, the at least a portion of pixels may be all pixels in the frame to be processed. Taking all pixels as processing objects can reflect the luminance characteristics of the frame to be processed in a more accurate way. In addition, in order to expedite processing, pixels can also be selected from the frame to be processed at a predetermined pixel interval to determine the at least a portion of pixels. For example, one pixel can be selected as a representative pixel at a distance of every 4 pixels in each row/column, and these selected representative pixels can also reflect the luminance characteristics of the frame to be processed to a large extent. Although some following examples illustrate the basic principle of the application by taking all pixels as processing objects for the sake of simplicity, it could be understood by those skilled in the art after reading the application that the following embodiments can also take the selected representative pixels as the processing objects, which will not be repeated below. In other examples, according to the principle and purpose of the subsequent processing process, the extracted luminance statistical information may also include an average luminance value, a maximum luminance value, a minimum luminance value, and/or other similar information of the at least a portion of pixels. Because the luminance histogram information includes the statistics of pixels of each luminance in the image, which is closely related to the content of the image, extracting the luminance histogram information of all pixels can provide data applicable for changing the dynamic range of luminance according to the content of the image, thus providing a possibility to improve the quality of the changing process.

Still referring to FIG. 2, in step S304, the changing method 30 clusters all pixels into pixel groups divided by multiple luminance flag values based on the luminance statistical information of at least a portion of pixels. Each of the pixel groups may include a predetermined number of pixels. It should be noted that according to the division scheme, the number of pixels in each of the pixel groups may not be equal. The predetermined number in this application can be determined based on the division scheme. Since the division scheme is generally predetermined, the number of pixels in each of the pixel groups can be determined according to the division scheme. In addition, the pixels in each two adjacent pixel groups can be divided by one of the multiple luminance flag values, for example, X (X is a natural number) luminance flag values can divide the pixels into X+1 groups. It can be expected that as a result of the clustering, the luminance flag values will become the luminance boundary of each of the pixel groups in the cluster. Therefore, even for the same frame image, if different clustering schemes are selected, the multiple corresponding luminance flag values will also be different.

In some examples, for example, in some less demanding applications, the luminance flag values can be selected from top values of two luminance values of adjacent pixel groups or a value between the top values. For example, if the luminance value of pixel group A is between B and C (C>B), and the luminance value of the adjacent pixel group D is between E and F (F>E>C), then the luminance flag value to distinguish the pixel groups A and D can be selected from [C, E].

Still referring to FIG. 2, the changing method 30 generates a conversion mapping relationship based on the multiple luminance flag values in step S306 such that the frame to be processed can be converted into a target frame with the target dynamic range of luminance at least partially based on the conversion mapping relationship. The conversion mapping relationship generated here provides data support for changing a dynamic range of luminance of the frame to be processed, but in this example, the process of changing a dynamic range of luminance is not a must. The process of generating the conversion mapping relationship can also be called fitting. In some examples, the luminance flag values can be configured with their mapping values in the target dynamic range of luminance, and the remaining luminance values in the original dynamic range of luminance can be fitted according to the luminance flag values and the corresponding mapping values. It can be understood that the mapping values corresponding to the remaining luminance values can be determined based on the relative position relationship between these luminance values and the luminance flag values. Some examples in this application do not limit the fitting method. The fitting may be carried out in a simple linear fitting method or in a more complex curve fitting method. In view of this, these luminance flag values and their corresponding mapping values may or may not be on the fitted curve. In other examples, instead of directly configuring the luminance flag value with mapping value in the target dynamic range of luminance, a functional relationship is formed based on the multiple luminance flag values, and this functional relationship is used as the conversion mapping relationship.

The conversion mapping relationship in this application can associate original luminance values in the original dynamic range of luminance with target luminance values in the target dynamic range of luminance. It should be noted that this association can be in various forms, either in an explicit form (directly available) or in an implicit form (calculated), as long as the corresponding mapping value of each luminance value can be determined according to the conversion mapping relationship. For example, the conversion mapping relationship can be a function, a two-dimensional or multidimensional table, and so on.

In addition, the luminance flag values may be used as basis points or reference points of the conversion mapping relationship. It can be expected that the more pixel groups are clustered, the more luminance flag values will be required, that is, the more reference points will be. The conversion mapping relationship generated based on more luminance flag values can more accurately reflect the mapping relationship from luminance values in the original dynamic range of luminance to the mapping values in the target dynamic range of luminance.

According to some embodiments of the present application, according to the above steps S302-S306, the conversion mapping relationship corresponding to the frame to be processed can be generated. This conversion mapping relationship may be generated in real-time and used for image processing in real-time, and may be discarded after use. Alternately, this conversion mapping relationship may also be stored for a short time (for example, from a few seconds to few tens of seconds) for image processing, such as one or more adjacent image frames of the same video, and may be discarded after use. In some cases, the conversion mapping relationship may also be stored for a long time. For example, the image can be preprocessed to generate and store the conversion mapping relationship, and then the stored conversion mapping relationship can be accessed for image processing. In some cases, the conversion mapping relationship can also be actively deleted. In addition, the generated conversion mapping relationship can be stored together with the frame to be processed, and according to the possible scheme of the target dynamic range of luminance, the conversion mapping relationship corresponding to each frame to be processed can be not unique (for example, there are different conversion mapping relationships with different number of luminance flag values). If desired, one of the schemes can be selected for image processing.

In some embodiments of the present application, still referring to FIG. 2, the changing method 30 can also convert the frame to be processed into a target frame with a target dynamic range of luminance at least partially based on the conversion mapping relationship in step S308. In some applications, the conversion mapping relationship generated in step S306 needs to be used for image processing in real time or substantially in real time, so as to generate target frames with a target dynamic range of luminance, which can preferably be displayed on the display device that can show images of the target dynamic range of luminance. For example, a set-top box device may implement dynamic range conversion for the original video with SDR image, and send the converted HDR video to the display device such as a TV set that supports the HDR standard.

In some embodiments of the present application, the conversion mapping relationship generated in step S306 above includes conversion mapping parameters for fitting a conversion mapping curve indicative of the conversion mapping relationship. For example, in some examples, the conversion mapping curve can be a Bessel curve, and the conversion mapping parameters include a Bessel curve control point. The advantage of using the Bessel curve to calculate the conversion mapping curve such as SDR image to HDR image is that its mapping curve is relatively smooth and can be controlled only by adjusting the control points. When the value differences between adjacent control points are small, changes in value in the Bessel curve at the corresponding positions of control points may be relatively gentle. On the contrary, when the value differences between adjacent control points are large, the changes in value in the Bessel curve at the corresponding positions of control points may be large.

In some embodiments of the present application, the above step S304 can cluster all pixels into multiple pixel groups according to the luminance values based on the luminance histogram information of all pixels. Specifically, the step S304 can include steps S342 and S344 described in detail below.

Figure 3:
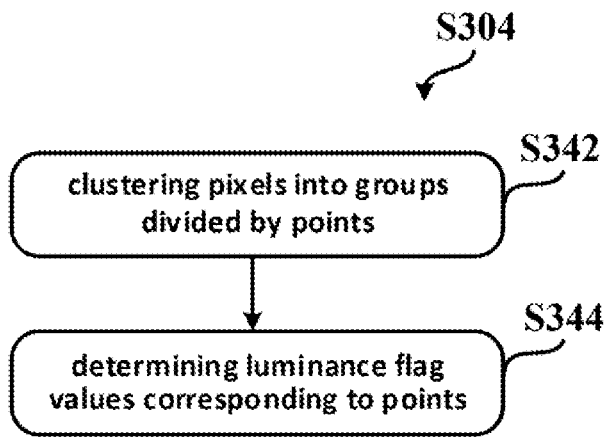
FIG. 3 depicts a method for changing a dynamic range of luminance of an image according to an embodiment of the present application.
Figure 6:
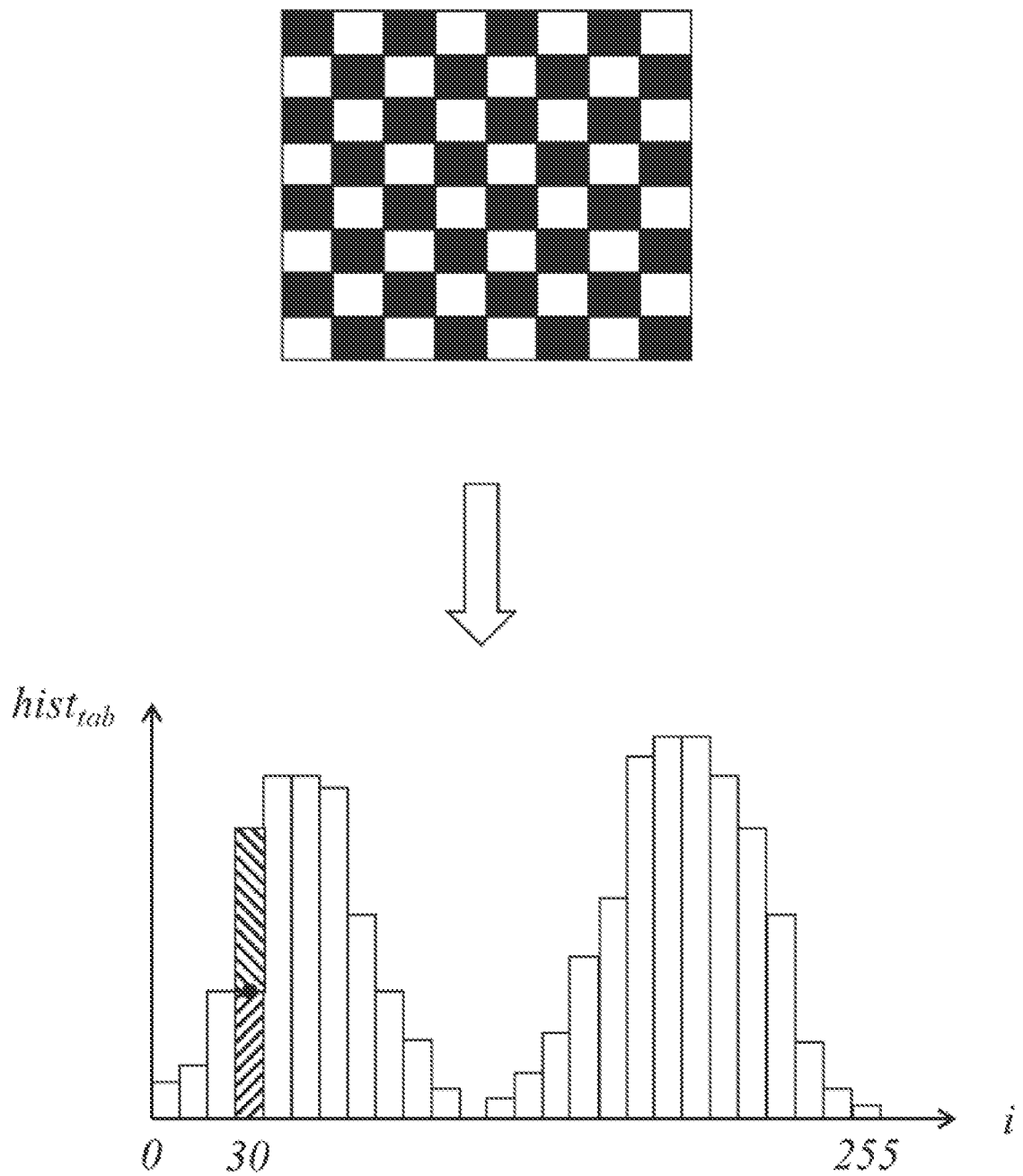
FIG. 6 depicts a process of changing a dynamic range of luminance of an image according to an embodiment of the present application.

As shown in FIG. 3, the changing method 30 can cluster all the pixels of the frame to be processed into the pixel groups divided by multiple points by counting based on a predetermined rule in step S342. In some embodiments, the predetermined rule is to divide evenly according to the number of pixels. For example, for 1000000 pixels, if they need to be divided into 10 pixel groups, these pixels can first be sorted by the luminance value, and then 9 points are selected according to the sorting order of pixels, which can be pixel No. 100000, pixel No. 200000, . . . , and pixel No. 900000 respectively. Because the points divide the pixels into the multiple pixel groups, as an example, pixels Nos. 1-100000 are clustered into the first group, and pixels Nos. 100001-200000 are clustered into the second group . . . etc. As described above, the pixels are clustered according to the luminance values. In other words, the counting of pixels is also based on the luminance values. Even pixels of the same luminance can be assigned with respective serial numbers. For example, as shown in FIG. 6, it depicts a process of changing a dynamic range of luminance of an image according to an embodiment of the present application. If the total number of pixels with a luminance value of 0 is 25, the pixels falling into a "band" with the luminance value of 0 may be numbered 1, 2, . . . , 25. If the total number of pixels with a luminance value of 1 is 30, the pixels falling into a "band" with the luminance value of 1 will be numbered 26, 27, . . . , 55, and so on. In some examples, if the 100000th pixel (shown as the point in the band) falls into the "band" with a luminance value of 30, and the "band" with the luminance value of 30 includes a total of 20000 pixels numbered 90000-109999, then the pixels numbered 90000-100000 can be clustered into one group, and the pixels numbered 100001-109999 can be clustered into another group.

In other examples, the clustering scheme and corresponding points can also be determined by a power function, an exponential function and other functions. It can be expected that compared with dividing evenly, these schemes can achieve finer granularity for a specific range of luminance, so the conversion effect of this part of the luminance range will also be improved. For example, the power function can be established so that the value of a dependent variable of the power function corresponds to the number of pixels. Then an independent variable of the power function can be valued at a fixed interval to determine the corresponding values of the dependent variable. These values of the dependent variable can be used as points of clustering.

Still referring to FIG. 3, the changing method 30 sums the pixels which correspond to the respective luminance values in the luminance histogram information, till the respective points in an order from low to high (or from high to low) in step S34, such that the luminance flag value corresponding to each of the multiple points can be determined. As mentioned above, since the selection of the luminance flag values is closely related to the clustering scheme (or more specifically, the points), a reasonable clustering scheme may help to select the appropriate luminance flag values, and thus help to form a reasonable mapping relationship.

For example, continuing with the above example, if the 100000th pixel falls into the "band" with a luminance value of 30, in some simplified schemes, 30 can be used as a luminance flag value. In some more detailed schemes, the luminance flag value corresponding to point No. 100000 can also be determined according to the total number of pixels falling into the "band" with a luminance value of 30.

In some embodiments of the present application, step S344 can specifically include the following process: determining a luminance flag value $anchor_{value}$ corresponding to a point $anchor_{thr}$ based on an equation (4) below, when a summed pixel number $sum_{prev}$ till a luminance value i−1 and another summed pixel number $\text{sum}_{current}$ till a luminance value i satisfy $\text{sum}_{prev} < \text{anchor}_{thr} \leq \text{sum}_{current}$:

$$\text{anchor}_{value} = (i-1) + ra \tag{4}$$

Figure 9:
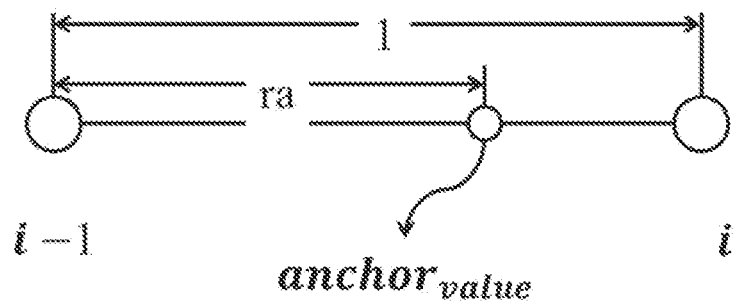
FIG. 9 depicts a process of changing a dynamic range of luminance of an image according to an embodiment of the present application.

The relationship between $\text{anchor}_{value}$ and i, i−1 and ra is shown in FIG. 9, wherein, i is a natural number. i may ranges 0~255 if the luminance of the image is represented in a depth of 8 bits. The parameter ra can be determined using the following equation (5):

$$ra = ((\text{anchor}_{thr} - \text{sum}_{prev})/\text{hist}_{tab}[i]) \tag{5}$$

where $\text{hist}_{tab}[i]$ represents a pixel number corresponding to the luminance value i in the luminance histogram information.

For example, continuing with the above example, for the 100000th pixel, $\text{anchor}_{thr} = 100000$, which is in the "band" with number i=30, and $\text{hist}_{tab}[30] = 20000$. Then the corresponding luminance flag value $$\text{anchor}_{value} = (30-1) + \left(\frac{100000 - 89999}{20000}\right) \approx 29.5.$$

89999 is the cumulative number of pixels in each "band" before the 90000th pixel. It can be seen that the luminance flag value determined according to some examples of the present application may not be an integer value. That is, the determined luminance flag value may not be a real luminance value in the image, but it is still sufficient as a reference value or basis value to separate or distinguish different luminance values.

Figure 4:
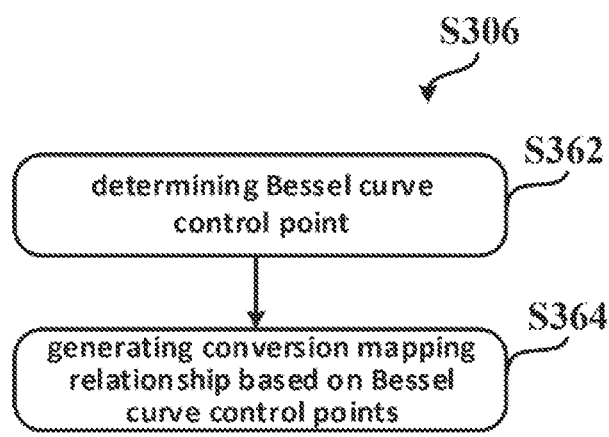
FIG. 4 depicts a method for changing a dynamic range of luminance of an image according to an embodiment of the present application.
Figure 10:
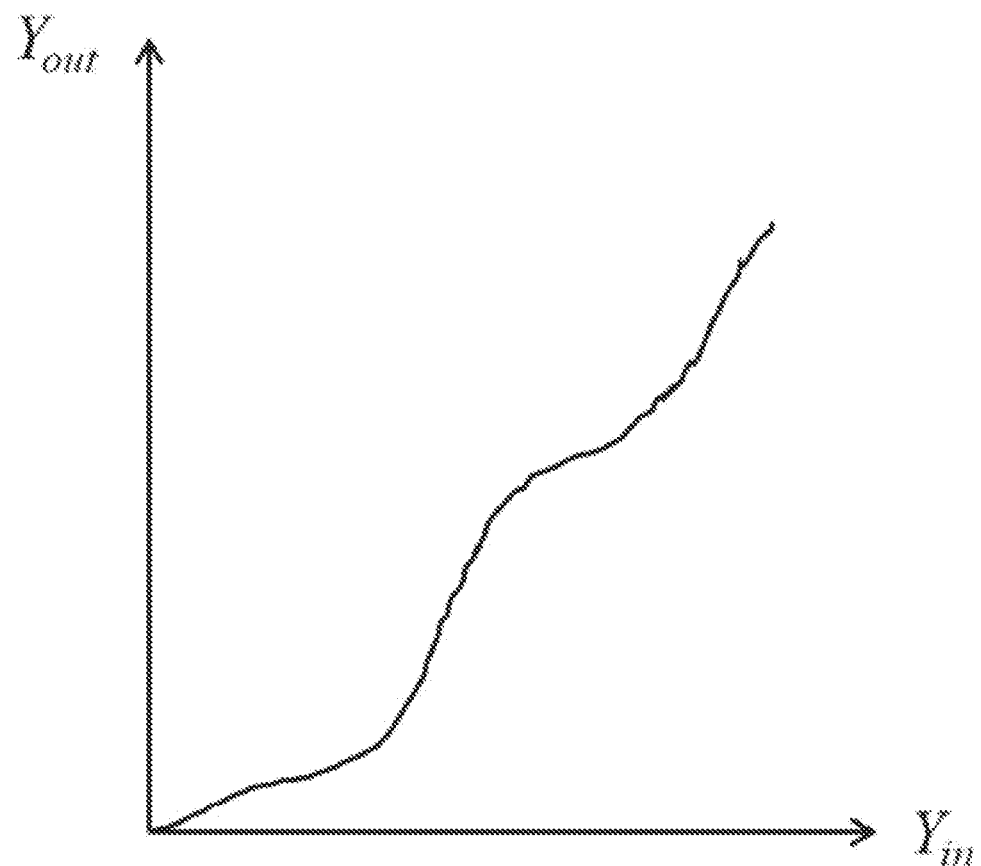
FIG. 10 depicts a conversion mapping curve of a dynamic range of luminance of an image according to an embodiment of the present application.

In some embodiments of this application, as shown in FIG. 4, the process of generating the conversion mapping relationship in the above step S306 can specifically include: step S362 of determining the Bessel curve control point based on the luminance flag value, and step S364 of generating the conversion mapping relationship based on the Bessel curve control points. In other words, the Bessel curve can be fitted. In step S362, Bessel curve control points may be formed based on the luminance flag values. It can be understood that when the adjacent luminance flag values are not significantly different, the difference between their corresponding Bessel curve control points may also be small, which is reflected as a relatively flat curve segment in the Bessel curve. On the contrary, when the adjacent luminance flag values are significantly different, the difference between their corresponding Bessel curve control points may also be large, which is reflected as a relatively steep curve segment in the Bessel curve. FIG. 10 shows a fitted Bessel curve, in which the horizontal axis represents the original luminance value and the vertical axis represents the mapping value after dynamic range conversion. In some examples, Yin can represent the SDR luminance value, and Yout can represent the HDR luminance value.

In some embodiments of this application, the above step S362 can specifically include the following process: determining a value $\text{anchor}_{ctl}$ of the Bessel curve control point corresponding to the luminance flag value $\text{anchor}_{value}$ based on an equation (6) below:

$$\text{anchor}_{ctl} = (2^H - 1) * (\text{anchor}_{value} + 2^{S-1})/(2^S - 1) \tag{6}$$

where S represents a digital representation bit depth of the original dynamic range of luminance (for example, SDR) such as 8. H represents a digital representation bit depth of the target dynamic range of luminance (for example, HDR) such as 12. In this case, the above equation for calculating the value of Bessel curve control points can be rewritten as: $\text{anchor}_{ctl} = 4095 * (\text{anchor}_{value} + 128)/255$.

In some embodiments of the present application, determining the Bessel curve control point also includes: assigning the values of a portion of the Bessel curve control points greater than the first threshold as the first threshold, and assigning the values of a portion of the Bessel curve control points lower than the second threshold as the second threshold. In some examples, in order to prevent the converted image from being too dark or too bright, the maximum and minimum values of the multiple control points can be set in advance to limit the value of the resulting Bessel curve control points. For example, the maximum value of Bessel curve control points can be preset as MAX and the minimum value can be preset as MIN, and all Bessel curve control points with values greater than MAX are sliced to MAX, and Bessel curve control points with values less than MIN are sliced to MIN. In the context of this application, the above process is referred to as the slicing of Bessel curve control points.

The Bessel curve is taken as an example to illustrate how to generate the conversion mapping relationship. Following this principle, the curve can also be fitted in other mathematical forms. For example, in some embodiments of the present application, the conversion mapping curve can be a polynomial fitting curve, and the conversion mapping parameters comprise polynomial fitting coefficients. In some other examples, the conversion mapping curve is an exponential fitting curve, and the conversion mapping parameters include a fitting coefficient and a fitting index. Due to space limitation, the curve fitting process will not be described in detail here. Those skilled in the art can use the existing mathematical principles to realize the fitting process of the conversion mapping curve after learning the basic principles of the application.

In addition, the inventor of the present application found that in video processing, the mapping curves from SDR to HDR are generally the same through different frames of a same scene. However, if the SDR-to-HDR mapping curve of different frames of the same scene (especially in a still scene) changes abruptly due to noise, then the output video of SDR-to-HDR may flicker between frames. In order to further improve the robustness of the algorithm, some examples of this application use histogram information and the corresponding control point values of the current frame and its adjacent frames to calculate the SDR-to-HDR mapping curve of the current frame.

In some embodiments of the present application, the changing method 30 also includes the following steps (not shown in the figure): determining whether there is a scene change in the frame to be processed relative to the multiple adjacent frames of the video in which it is located. Accordingly, in step S304, all pixels can be clustered into multiple pixel groups according to the luminance value based on the determination result of the previous step. Specifically, if there is any scene change, then all pixels of the frame to be processed can be clustered directly according to the luminance value. If there is no scene change, in this step, smooth filtering can be performed based on the luminance histogram information of all pixels in at least one of the multiple adjacent frames and the luminance histogram information of all pixels in the frame to be processed (for example, the pixel count value of each luminance value in the histogram is averaged), and then the result of smooth filtering can be clustered into multiple pixel groups. The adjacent frames here can refer to the adjacent N frames (if any) before and after the frame to be processed, and the number of selected adjacent frames before and after the frame to be processed can be different. In some scenes, N can take an integer value such as 3, 4 or 5. It should be noted that in this embodiment, in addition to smooth filtering based on the luminance histogram information, other steps can be carried out according to the above embodiment. In some preferred embodiments, the current frame and its previous N frames can be processed to calculate the conversion mapping relationship, instead of selecting the subsequent frames, which can avoid increasing the processing delay.

In some embodiments of the present application, step S308 in the changing method 30 may also include the following process. In some examples, it can be first determined whether there is a scene change in the frame to be processed relative to the multiple adjacent frames of the video in which it is located. If there is any scene change, the frame to be processed can be directly converted to the target frame through the conversion mapping relationship of the frame to be processed. If there is no scene change, the frame to be processed can be converted to the target frame based on the conversion mapping relationship of the frame to be processed and the conversion mapping relationship of at least one of the multiple adjacent frames. The adjacent frames here can refer to the adjacent N frames (if any) before and after the frame to be processed, and the number of selected adjacent frames before and after the frame to be processed can be different. In some scenes, N can take a value such as 3, 4 or 5.

It should be understood that the above two embodiments can be implemented in combination in order to eliminate flicker of conversions between multiple frames to certain extent, wherein any existing method can be used to determine whether there is any scene change in the frame to be processed. For example, it can be determined by determining whether the difference between the average luminance value of the frame to be processed and the average luminance value of the previous and subsequent frames is greater than a threshold value.

In some embodiments of the present application, the changing method 30 converts the frame to be processed into a target frame with a target dynamic range of luminance in step S308, which can specifically include the following process. Firstly, a lookup table can be formed according to the conversion mapping relationship. Secondly, the frame to be processed is converted to a target frame with a target dynamic range of luminance at least partially based on the lookup table. The use of the lookup table can improve the conversion efficiency and reduce the requirements of online calculation compared with the use of functions to represent the conversion mapping relationship. It can be understood that the representation of the conversion mapping relationship in the form of lookup table trades off storage for calculation.

On the other hand, in order to alleviate the growing demand for storage, the lookup table of the conversion mapping relationship of adjacent frames can be saved in a differential form. For example, the conversion mapping relationship of the reference frame can be represented by a complete lookup table, for example, it can include the complete original luminance values and their corresponding mapping values. However, each adjacent frame referring to the conversion mapping relationship of the reference frame can only save (1) the original luminance values and (2) the difference between the mapping values corresponding to the original luminance values and the corresponding mapping values in the reference frame. For example, if the corresponding mapping value of a pixel with an original value of 128 (8 bit) in the reference frame is 512 (10 bit), and the corresponding mapping value of a pixel with an original value of 128 (8 bit) in the adjacent frame is 511 (10 bit), then the mapping value of the pixel in the adjacent frame can be recorded as −1.

In some embodiments of this application, the conversion mapping relationship generated in step S308 is a lookup table. It should be understood that the lookup table exists as the final product, and step S308 may include several intermediate products in the specific implementation process, for example, it may include conversion mapping parameters representing conversion mapping functions.

In some embodiments of the present application, the original luminance histogram of the frame to be processed is taken as the processing object in step S302. At this time, the luminance histogram information is the original luminance histogram. In practical applications, it may be expected that the mapping curve from SDR to HDR can be adjusted to some extent, so as to realize the adjustment of SDR to HDR images. For this purpose, the original luminance histogram can be adjusted to certain extent, so that the corresponding adjustment of the output image can be achieved. Therefore, in some other embodiments, the original luminance histogram of the frame to be processed can also be processed in advance, and the processed adjusted luminance histogram can be used as the object of subsequent operations. At this time, the adjusted luminance histogram may be used as the luminance histogram information for subsequent processing.

In some examples, the adjusted luminance histogram may slice a count of pixels with respect to at least the first portion of the luminance values of the original luminance histogram of the frame to be processed.

Figure 7:
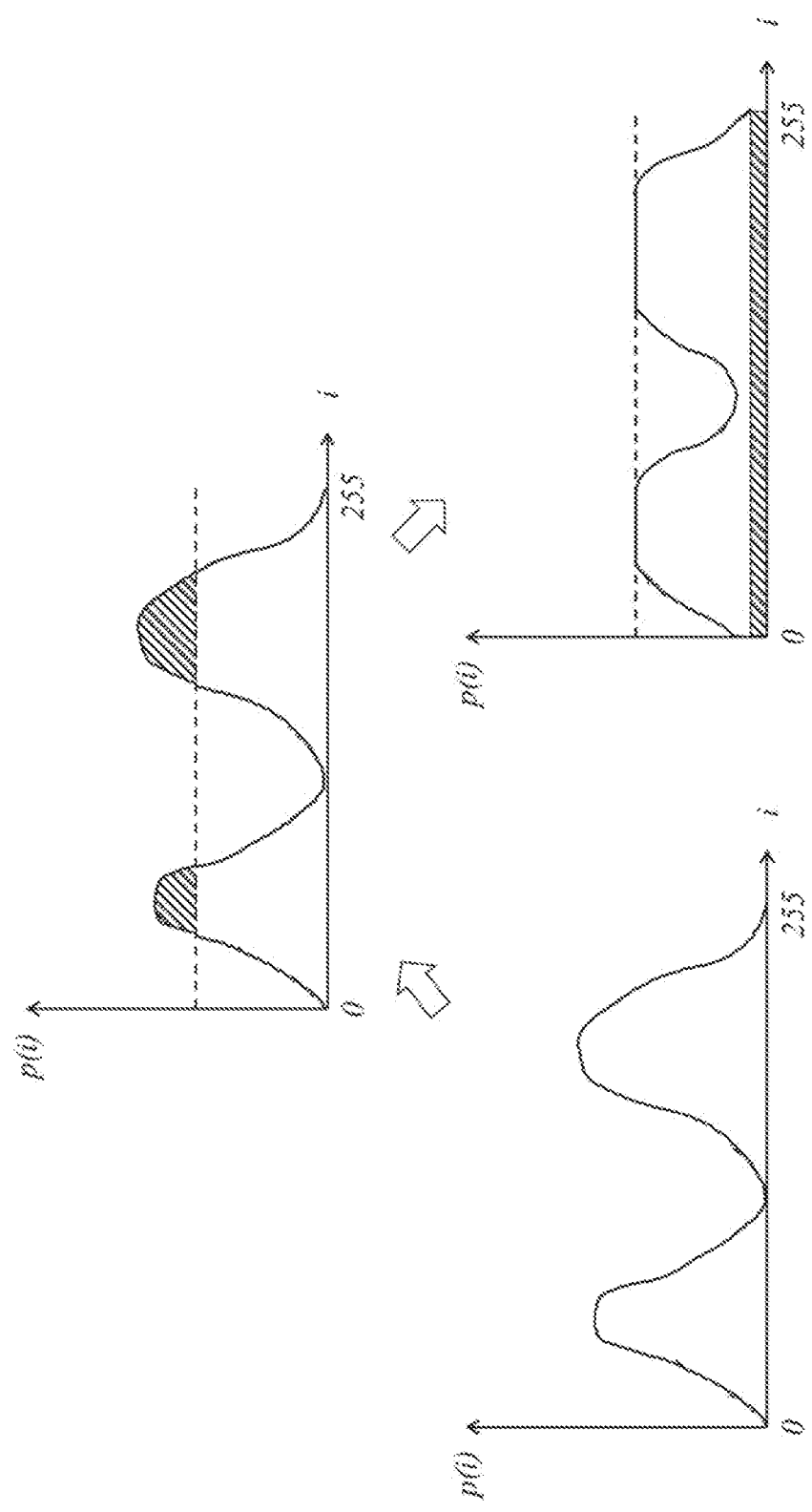
FIG. 7 depicts a process of changing a dynamic range of luminance of an image according to an embodiment of the present application.

FIG. 7 shows an optional slicing scheme. The lower left figure in FIG. 7 shows an original luminance histogram of a frame to be processed. The upper figure in FIG. 7 shows a slicing strategy, that is, all parts of the original luminance histogram whose amplitudes are greater than a predetermined value are removed (the shadow area is the part to be removed), and the removed part can be evenly filled into respective luminance values of the histogram. The lower right figure in FIG. 7 shows the adjusted luminance histogram after the slicing operation, where the shadow area is the filled part described above. That is, the area of that shadow area is equal to the area of the shadow area in the upper figure in FIG. 7.

Figure 8:
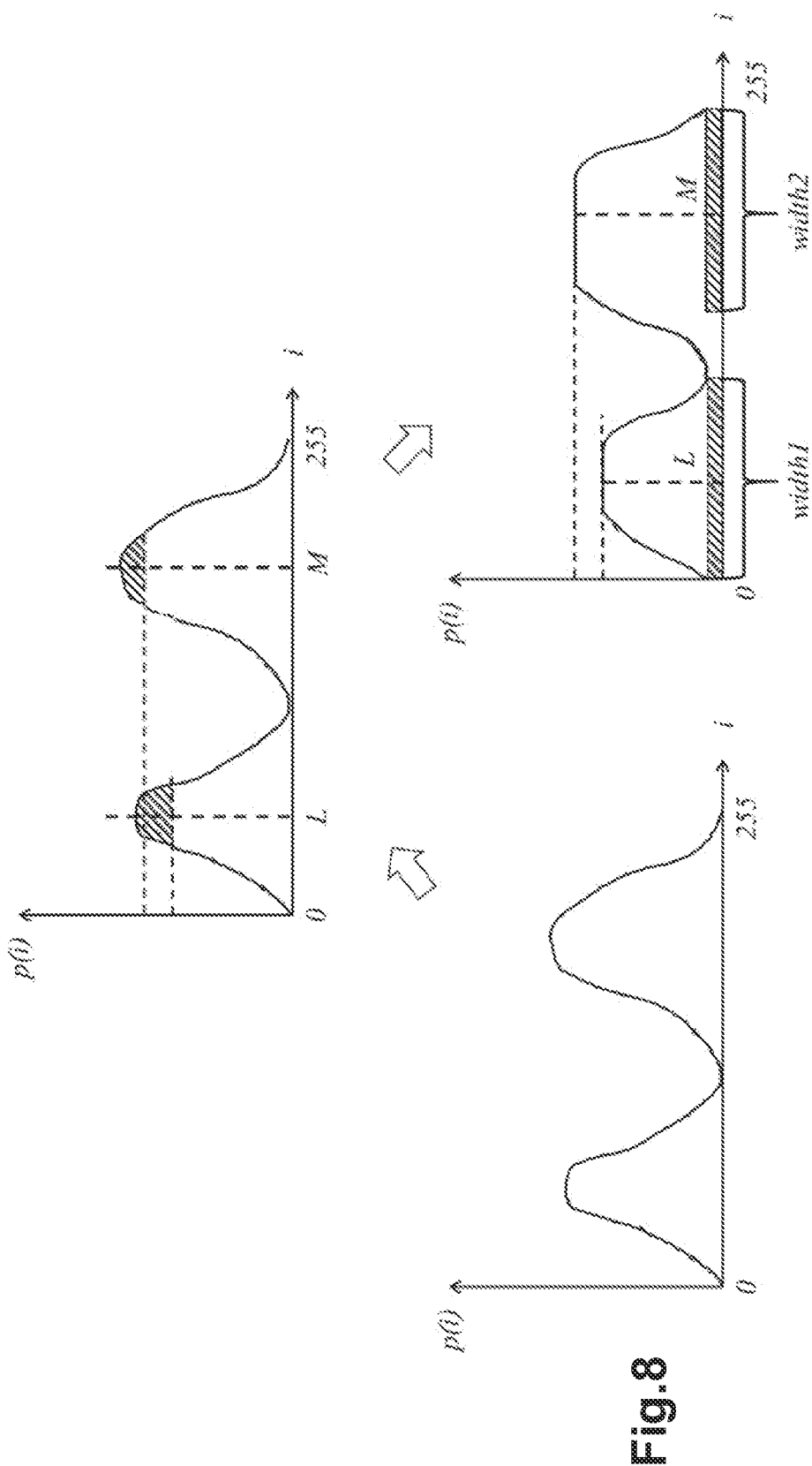
FIG. 8 depicts a process of changing a dynamic range of luminance of an image according to an embodiment of the present application.

In some embodiments of the present application, the portion of the original histogram that is greater than a third threshold value may be adjusted to at least the second portion of the luminance value of the original histogram by amplitude slicing in the adjusted luminance histogram. FIG. 8 shows another optional slicing scheme. The lower left figure in FIG. 8 shows an original luminance histogram of the frame to be processed. The upper figure in FIG. 8 shows a slicing strategy. Compared with the limiting strategy shown in FIG. 7, the slicing strategy in FIG. 8 is based on respective regions of the histogram. As shown in FIG. 8, the left part of the original luminance histogram whose amplitude is greater than the threshold value is all removed (where the shadow area is the part to be removed) and the right part whose amplitude is greater than the other threshold value is all removed (where the shadow area is the part to be removed).

As shown in the upper figure in FIG. 8, assuming that the removed part in the left part is an area centered at the luminance value L, the removed part can be evenly filled into the area centered at the luminance value L and with a width of width1. Similarly, assuming that the removed part in the right part is an area centered at the luminance value M, the removed part can be evenly filled into the area centered at the luminance value M and with a width of width2. As a typical example, width1 or width2 can be 40 (its unit is the same as the unit of the original luminance value), where width1 or width2 can have the same value or different values. The lower right figure in FIG. 8 shows the adjusted luminance histogram after performing the slicing operation, where the shadow area is the filled part as described above.

Turning back to FIG. 1, the dynamic luminance range conversion mechanism can be divided into two parts. Steps S201-S206 are intended to generate a mapping curve corresponding to each frame, while steps S211-S217 are intended to perform processing such as converting SDR images to HDR images based on the generated mapping curve.

As shown in FIG. 1, for the changing from SDR images to HDR images, the scheme 20 converts the format of the input SDR image in step S201/S211, for example, from YCbCr format to RGB format. In step S202/S212, the RGB color in a nonlinear color space is converted to the RGB color in a linear space using an electro-optical transfer function (EOTF) conforming to a standard such as the BT.1886 format to obtain various color components Rsdr, Gsdr and Bsdr respectively. Then, in step S203/S213, the image is converted from the RGB color space to XYZ color space, and the Y component (i.e. luminance component Ysdr) is extracted separately for use in subsequent steps. The luminance expansion coefficient ratio can be determined in step S204/S214, and the specific steps will be described separately below. In step S205/S215, an expansion coefficient can be used to calculate expanded R, G, and B components (represented as Rhdr, Ghdr, and Bhdr, respectively), where Rhdr=Rsdr*ratio, Ghdr=Gsdr*ratio, and Bhdr=Bsdr*ratio. Then, in step S206/S216, the expanded Rhdr, Ghdr and Bhdr components can be converted into RGB components of the corresponding nonlinear color space using the opto-electric transfer function (OETF) conforming to the corresponding HDR standard (such as HLG, HDR10, etc.), and finally can be converted into YCbCr format and output in step S217.

Scheme 20 performs luminance information statistics on the extracted Y components in step S204/S214. For the specific process, please refer to step S302 and its various examples described in detail above. The statistical information can include a maximum luminance, a minimum luminance, an average luminance, an luminance histogram and other information of the frame to be processed. The luminance histogram statistics can be numbers of pixels corresponding to respective luminance value in a frame, or pixel proportions corresponding to respective luminance values in a frame. It can be seen that the histogram information presents the distribution of the luminance values of all the pixels, and the luminance degree of the image can be directly reflected through the histogram information. The histogram information is related to a bit width of the image pixel representing the frame to be processed. For example, if the bit width of the image pixel is 8 bit, then the luminance value range is 0~255. Take the frame to be processed of 8 bit pixel as an example, the histogram information can be expressed by an equation (7):

$$p(i)=\Sigma_{I(x,y)=i}\delta(I=i) \quad (7)$$

where, the value range of luminance value i is 0~255, and I(x,y) represents the luminance value at an image coordinate (x, y). In some examples, if the histogram counts the number of pixels, then $\delta(I=i)$ means to count the pixels with luminance of i within the current image range. In other examples, if the histogram counts the proportion of each luminance, then $\delta(I=i)$ means to count the pixels with luminance i in the current image range and determines their proportion to the total pixels.

In step S205, the mapping curve can be generated according to the luminance statistical information. The method for generating the mapping curve can refer to the above embodiments. For a Bessel curve, its calculation method can be expressed by an equation (8):

$$B_N(t) = \sum_{k=0}^{N} \binom{N}{k}(t)^k(1-t)^{N-k}P_k \text{ where } \binom{N}{k} = \frac{N!}{k!(N-k)!}. \quad (8)$$

$P_k$: $P_0 \ldots P_N$ represents N+1 control points of a Bessel curve. $P_0$ represents a start point of the Bessel curve, while $P_N$ represents an end point of the Bessel curve. From the above equation, the shape of the Bessel curve is only related with $P_k$. When the value of N is 10, the above equation represents the tenth order Bessel curve.

Characteristics of a Bessel Curve

Among the control points of the Bessel curve, the start and end control points are completely coincident with the calculated Bessel curve, while other control points may not be completely coincident with the Bessel curve. For example, in an SDR-to-HDR mapping curve, the value of the start point is 0, and the mapping value is also 0, so the start point coordinate is (0, 0). The value of the end point is 1, and the mapping value is 1, so the end point coordinate is (1, 1), where 1 is the normalized value.

Control Point Calculation of a Bessel Curve

According to the characteristics of a Bessel curve, it is calculated based on an order and corresponding control points of the Bessel curve. Some embodiments of this application use the method based on histogram accumulation to calculate the control points of the Bessel curve. If other methods are used to fit the mapping curve, it is also desired to calculate the coordinates of some mapping points to fit the mapping curve. Similarly, the mapping coordinates can also be calculated using the histogram accumulation method.

The calculation of the control points of the Bessel curve is illustrated by taking the tenth order Bessel curve as an example. Since the tenth order Bessel curve is adopted, 11 Bessel control points are required. However, the characteristics of the SDR-to-HDR mapping relationship is that it increases monotonically with the luminance value, and the luminance values and its mapping values of the start point and end point are known, so only the remaining 9 control points need to be calculated.

Take an 8 bit histogram (that is, pixels are represented by 8 bit, and the gray level in the histogram is 0~255) as an example. Firstly, nine points for separating pixels are preset, and these nine points are arranged in order from low to high. Then the values in the histogram are accumulated from the low luminance level to the high luminance level. When the accumulated value is greater than or equal to one of the preset points, the luminance value of the histogram corresponding to the accumulated value of the histogram is recorded at this time (also known as the luminance flag value in this application), and a Bessel curve control point is obtained based on the luminance value. Since there are 9 points, 9 Bessel curve control points can be calculated.

Firstly, as shown in the upper half of FIG. 6, the total number of image pixels can be calculated according to the image resolution $\text{sum}_{pix}$=width*height. In some examples, 9 points $\text{anchor}_{thr}$ can also be determined according to the following equation (8):

$$\text{anchor}_{thr(n)} = n * \frac{\text{sum}_{pix}}{10}, n = 1, \ldots, 9 \quad (9)$$

The points are calculated here by means of average division. In other embodiments, other methods can also be used to calculate the points for pixels. For example, a power function, such as an exponential function, and other methods can be used to determine the point. In addition, the number of pixels corresponding to the histogram whose luminance value is i is represented as $\text{hist}_{tab}[i]$. $\text{sum}_{pix}$ can be determined by an equation (10) based on the characteristics of the histogram:

$$\text{sum}_{pix} = \Sigma_{i=0}^{255} \text{hist}_{tab}[i] \quad (10)$$

The preliminary control points are calculated as follows:
(1) The values in the histogram information are accumulated in an order from low luminance to high luminance till $\text{hist}_{idx}$: $\text{sum}_{val} = \Sigma_{i=0}^{\text{hist}_{idx}} \text{hist}_{tab}[i]$. When the cumulative value $\text{sum}_{val}$ is greater than or equal to the point $\text{anchor}_{thr(n)}$ calculated previously, the luminance value of the corresponding histogram is recorded at this time and the value $\text{hist}_{idx}$ is recorded.
(2) The corresponding luminance value in the histogram is calculated when the cumulative value $\text{sum}_{val}$ is equal to the point $\text{anchor}_{thr(n)}$. This process can be carried out with reference to the detailed description of step S344 above. The luminance flag value can be expressed as: $\text{anchor}_{value1} = (\text{hist}_{idx} - 1) + \text{ra}$, where $\text{ra} = ((\text{anchor}_{thr(n)} - \text{sum}_{prew})/\text{hist\_tab}[i])$. $\text{sum}_{prew}$ represents the cumulative value of the corresponding histogram when $\text{hist}_{idx} - 1$. $\text{hist\_tab}[i]$ represents the value of the corresponding histogram when the luminance value is i.
(3) Calculating the preliminary control points:

$$\text{anchor}_{value2[n]} = \text{norm} * (\text{anchor}_{value1} + 128)/255$$

Take the SDR image with a bit depth of 8 bits as an example. In the above equation, norm is the maximum value of the luminance after the luminance dynamic range conversion, which can be set to $2^k - 1$, and k is generally set to a value greater than 10. For example, the value of k is 12, that is, the value of norm is set to 4095. $\text{anchor}_{value1}$ represents the corresponding luminance value in the histogram when $\text{sum}_{val}$ is equal to point $\text{anchor}_{thr(n)}$. $\text{anchor}_{value2[n]}$ represents the value of the nth control point preliminarily calculated. Take the value of n in the above steps as 1~9 in turn until all 9 control points are calculated.

The pseudocode for calculating control points is as follows:

```
sum_val = 0;
n = 0;
for i=0:255
    sum_val = sum_val + hist_tab[i]
    if( sum_val >= anchor_thr[n])
        hist_idx = i
        n = n + 1 ;
    end
end
``` where, hist_tab represents the histogram. hist_idx represents the recorded histogram coordinates when the cumulative value sum_val is greater than or equal to the point. anchor_thr[n] represents the preset point. anchor_val2[n] represents the calculated control point of the Bessel curve.

In order to prevent the converted image from being too dark or too bright, the maximum and minimum values of 9 control points are preset with ootf_max_val[n] and ootf_min_val[n]. These two top values are used to limit the amplitude of anchor_value2[n] to obtain the final anchor_value[n]. The pseudocode of luminance most value control is as follows:

```
if ( anchor_value2[n] > ootf_max_val[n] )
    anchor_value[n] = ootf_max_val[n]
else if ( anchor_value2[n] < ootf_min_val[n] )
    anchor_value[n] = ootf_min_val[n]
else
    anchor_value[n] = anchor_value2 [n]
```

In some examples, a lookup table corresponding to each frame can be generated and stored based on the generated mapping curve in step S206. In step S214, the required lookup table can be read as needed, and ratio=Yhdr/Ysdr is calculated based on it. It should be noted that for the same frame, the above steps S201-S206 and S211-S217 may be implemented at a certain interval.

Figure 5:
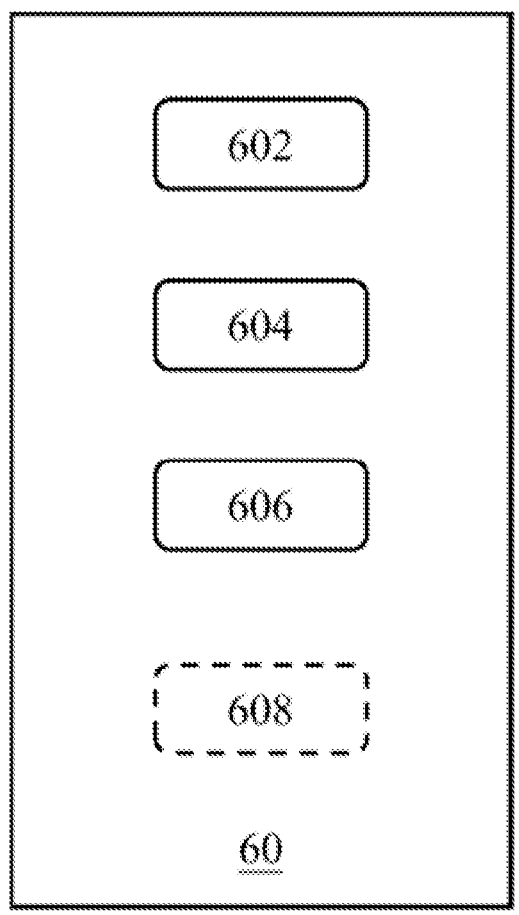
FIG. 5 depicts an image processing device according to an embodiment of the present application.

Another aspect of the present application provides an image processing device, as shown in FIG. 5. The image processing device 60 comprises a statistical unit 602, a clustering unit 604, a mapping unit 606 and an optional conversion unit 608. In some examples, the image processing device 60 may be a set-top box device or the like.

The statistical unit 602 of the image processing device 60 is configured to extract the luminance statistical information of the frame to be processed. The frame to be processed has the original dynamic range of luminance. In some examples, as long as the extracted luminance statistical information can be used to accomplish the tasks of each subsequent step, this application does not limit its form and content. In other examples, the luminance statistical information may include luminance histogram information of all pixels in the frame to be processed. The principle of extracting the luminance statistical information by the statistical unit 602 can refer to the relevant steps in the method for changing a dynamic range of luminance of an image above. The relevant contents are also incorporated herein, and will not be repeated.

The clustering unit 604 of the image processing device 60 is configured to cluster all pixels into pixel groups divided by multiple luminance flag values based on the luminance statistical information of at least a portion of pixels, wherein each of the pixel groups includes a predetermined number of pixels, and pixels of each two adjacent pixel groups are divided by one of the multiple luminance flag values. The principle of clustering multiple pixel groups by the clustering unit 604 can refer to the relevant steps in the method for changing a dynamic range of luminance of an image above. The relevant contents are also incorporated herein, and will not be repeated.

The mapping unit 606 of the image processing device 60 is configured to generate a conversion mapping relationship based on the multiple luminance flag values such that the frame to be processed is converted into a target frame with a target dynamic range of luminance at least partially based on the conversion mapping relationship, wherein the conversion mapping relationship associates original luminance values in the original dynamic range of luminance with target luminance values in the target dynamic range of luminance. The principle of generating the conversion mapping relationship by the mapping unit 606 can refer to the relevant steps in the method for changing a dynamic range of luminance of an image above. The relevant contents are also incorporated herein, and will not be repeated.

Optionally, the image processing device 60 further comprises a conversion unit 608. The conversion unit 608 is configured to convert the frame to be processed into a target frame with a target dynamic range of luminance at least partially based on the conversion mapping relationship. The principle of converting the frame to be processed into a target frame by the conversion unit 608 can refer to the relevant steps in the method for changing a dynamic range of luminance of an image above. The relevant contents are also incorporated herein, and will not be repeated.

Another aspect of the present application provides an image processing device, comprising a statistical unit, a determination unit, a filtering unit, a clustering unit, a mapping unit and an optional conversion unit.

The statistical unit is configured to extract the luminance statistical information of the frame to be processed and each of its multiple adjacent frames, wherein the frame to be processed and each of the multiple adjacent frames have the original dynamic range of luminance, and the luminance statistical information includes the luminance histogram information of all pixels. The principle of extracting the luminance statistical information by the statistical unit can refer to the relevant steps in the method for changing a dynamic range of luminance of an image above. The relevant contents are also incorporated herein, and will not be repeated.

The determination unit is configured to determine whether there is a scene change in the frame to be processed relative to each of its multiple adjacent frames. The principle of determining whether there is a scene change by the determination unit can refer to the relevant steps in the method for changing a dynamic range of luminance of an image above. The relevant contents are also incorporated herein, and will not be repeated.

The filtering unit is configured to perform smooth filtering on each luminance value based on the luminance histogram information of all pixels in the frame to be processed and each of its multiple adjacent frames when the determination unit determines that there is no scene change, so as to form the adjusted luminance histogram information of all pixels in the frame to be processed. The principle of filtering by the filtering unit can refer to the relevant steps in the method for changing a dynamic range of luminance of an image above. The relevant contents are also incorporated herein, and will not be repeated.

The clustering unit is configured to cluster all pixels into multiple pixel groups based on the adjusted luminance histogram information of all pixels, wherein each of the pixel groups includes a predetermined number of pixels, and pixels of each two adjacent pixel groups are divided by one of the multiple luminance flag values. The principle of clustering multiple pixel groups by the clustering unit can refer to the relevant steps in the method for changing a dynamic range of luminance of an image above. The relevant contents are also incorporated herein, and will not be repeated.

The mapping unit is configured to generate a conversion mapping relationship based on the multiple luminance flag values such that the frame to be processed is converted into a target frame with a target dynamic range of luminance at least partially based on the conversion mapping relationship, wherein the conversion mapping relationship associates original luminance values in the original dynamic range of luminance with target luminance values in the target dynamic range of luminance. The principle of generating the conversion mapping relationship by the mapping unit can refer to the relevant steps in the method for changing a dynamic range of luminance of an image above. The relevant contents are also incorporated herein, and will not be repeated.

Optionally, the image processing device further comprises a conversion unit. The conversion unit is configured to convert the frame to be processed into a target frame with a target dynamic range of luminance at least partially based on the conversion mapping relationship. The principle of converting the frame to be processed into a target frame by the conversion unit can refer to the relevant steps in the method for changing a dynamic range of luminance of an image above. The relevant contents are also incorporated herein, and will not be repeated.

Another aspect of the present application provides a computer-readable storage medium, in which instructions are stored. When the instructions are executed by the processor, the processor is configured to execute any of the methods for changing a dynamic range of luminance of an image above. The computer-readable medium referred to in this application include various types of computer storage medium, which can be any available medium that can be accessed by a general-purpose or special-purpose computer. For example, computer-readable medium may include RAM, ROM, EPROM, E2PROM, registers, hard disks, removable disks, CD-ROM or other optical disk memory, disk memory or other magnetic storage devices, or any other temporary or non-temporary medium which can be used to carry or store desired program code units in the form of instructions or data structures, and which can be accessed by a general-purpose or special-purpose computer, or a general-purpose or special-purpose processor. For example, the disk used in this application usually copies data magnetically, while the disk uses laser to copy data optically. The above combination should also be included in the protection scope of computer-readable medium. The exemplary storage medium is coupled to the processor such that the processor can read and write information from/to the storage medium. Alternatively, the storage medium can be integrated into the processor. The processor and storage medium can reside in the ASIC. ASIC can reside in the user terminal. Alternatively, the processor and storage medium can reside in the user terminal as discrete components.

Another aspect of the present application provides a computer program product including instructions which cause the computer to execute any of the steps of the method for changing a dynamic range of luminance of an image above when executed by the computer.

In addition to the advantages described in detail above, the dynamic range conversion mechanism of luminance of this application can be compatible with the existing investment. The scheme described in this application can be implemented by adding fewer hardware costs, thus saving costs. The foregoing is only the specific implementation of this application, but the scope of protection of this application is not limited to this. Those skilled in the art could conceive of other feasible changes or substitutions according to the technical scope disclosed in this application, which are also covered by the protection scope of this application. The embodiments of the present application and the features in the embodiments could also be combined with each other if there is no conflict. The scope of protection of this application is subject to the records of the claims.

The invention claimed is:

1. A method for changing a dynamic range of luminance of an image, the method comprising:
   extracting luminance histogram information of all pixels of a frame to be processed, wherein the frame to be processed has an original dynamic range of luminance;
   clustering all the pixels of the frame to be processed into pixel groups divided by multiple points by counting based on a predetermined rule, wherein each of the pixel groups includes a predetermined number of pixels, and pixels of each two adjacent pixel groups are divided by one of the multiple points;
   summing pixel numbers corresponding to luminance values in the luminance histogram information till each of the multiple points to determine each of multiple luminance flag values corresponding to each of the multiple points and
   determining a Bessel curve control point for fitting a Bessel curve indicative of the Bessel curve control point based on the multiple luminance flag values such that the frame to be processed is converted into a target frame with a target dynamic range of luminance based on the Bessel curve, wherein the Bessel curve associates original luminance values in the original dynamic range of luminance with target luminance values in the target dynamic range of luminance;
   wherein determining each of the multiple luminance flag values corresponding to each of the multiple points comprises:
   determining a luminance flag value $anchor_{value}$ corresponding to a point $anchor_{thr}$ based on equations below, when a summed pixel number $sum_{prev}$ till a luminance value i−1 and another summed pixel number $sum_{current}$ till a luminance value i satisfy $sum_{prev} < anchor_{thr} \leq sum_{current}$:

$$anchor_{value} = (i-1) + ra, \quad (4)$$

$$ra = ((anchor_{thr} - sum_{prev})/hist_{tab}[i])$$

where $hist_{tab}[i]$ represents a pixel number corresponding to the luminance value i in the luminance histogram information.

2. The method of claim 1, wherein the predetermined rule is selected from one of the following: dividing evenly, dividing based on a power function or dividing based on an exponential function.

3. The method of claim 1, wherein determining the Bessel curve control point based on the multiple luminance flag values comprises:
   determining a value $anchor_{ctl}$ of the Bessel curve control point corresponding to the luminance flag value $anchor_{value}$ based on an equation below:

$$anchor_{ctl} = (2^H - 1) * (anchor_{value} + 2^{S-1})/(2^S - 1)$$

wherein S represents a digital representation bit depth of the original dynamic range of luminance, and H represents a digital representation bit depth of the target dynamic range of luminance.

4. The method of claim 1, wherein determining the Bessel curve control point further comprises:
   assigning the values of a portion of the Bessel curve control points greater than a first threshold as the first threshold, and
   assigning the values of a portion of the Bessel curve control points smaller than a second threshold as the second threshold.

5. The method of claim 1, wherein converting the frame to be processed into the target frame with the target dynamic range of luminance comprises:
   determining whether there is a scene change in the frame to be processed relative to multiple adjacent frames;
   converting, if there is a scene change, the frame to be processed into the target frame only based on the conversion mapping relationship of the frame to be processed;
   converting, if there is no scene change, the frame to be processed into the target frame based on the conversion mapping relationship of the frame to be processed and the conversion mapping relationship of at least one of the multiple adjacent frames.

6. The method of claim 1, wherein the luminance histogram information is an original luminance histogram of the frame to be processed.

7. The method of claim 1, wherein the luminance histogram information is an adjusted luminance histogram of the frame to be processed, wherein the adjusted luminance histogram limits a count of pixels with respect to at least the first portion of the luminance values of an original luminance histogram of the frame to be processed.

8. The method of claim 7, wherein a portion of an original histogram greater than a third threshold value is limited to at least the second portion of the luminance value of the original histogram in the adjusted luminance histogram.

9. The method of claim 1, wherein the original dynamic range of luminance is a Standard-Dynamic Range, and the target dynamic range of luminance is a High-Dynamic Range.

10. A method for changing a dynamic range of luminance of an image, the method comprising:
   extracting luminance histogram information of all pixels of a frame to be processed and each of its multiple adjacent frames, wherein the frame to be processed and each of the multiple adjacent frames have an original dynamic range of luminance;
   determining whether there is a scene change in the frame to be processed relative to each of its multiple adjacent frames; and if there is no scene change:
      forming an adjusted luminance histogram information of all the pixels in the frame to be processed based on the luminance histogram information of all the pixels in the frame to be processed and each of its multiple adjacent frames;
      clustering all the pixels of the frame to be processed into pixel groups divided by multiple points by counting based on a predetermined rule, wherein each of the pixel groups includes a predetermined number of pixels, and pixels of each two adjacent pixel groups are divided by one of the multiple points;
      summing pixel numbers corresponding to luminance values in the adjusted luminance histogram information of the frame to be processed till each of the multiple points to determine each of multiple luminance flag values corresponding to each of the multiple points; and
      determining a Bessel curve control point for fitting a Bessel curve indicative of the Bessel curve control point based on the multiple luminance flag values such that the frame to be processed is converted into a target frame with a target dynamic range of luminance at least partially based on the Bessel curve, wherein the Bessel curve associates original luminance values in the original dynamic range of luminance with target luminance values in the target dynamic range of luminance;

wherein determining each of the multiple luminance flag values corresponding to each of the multiple points comprises:

determining a luminance flag value $anchor_{value}$ corresponding to a point $anchor_{thr}$ based on equations below, when a summed pixel number $sum_{prev}$ till a luminance value i−1 and another summed pixel number $sum_{current}$ till a luminance value i satisfy $sum_{prev} < anchor_{thr} \leq sum_{current}$;

$$anchor_{value} = (i-1) + ra \quad (4)$$

$$ra = ((anchor_{thr} - sum_{prev})/hist_{tab}[i])$$

wherein $his_{tab}[i]$ represents a pixel number corresponding to the luminance value i in the adjusted luminance histogram information.

\* \* \* \* \*